United States Patent [19]

Bloom et al.

[11] 4,255,719

[45] Mar. 10, 1981

[54] MAINTENANCE OF OPTIMAL ORIENTATION IN $F_2^+$ COLOR CENTER LASERS

[75] Inventors: David M. Bloom, Menlo Park, Calif.; Linn F. Mollenauer, Colts Neck, N.J.

[73] Assignee: Bell Telephone Laboratories, Incorporated, Murray Hill, N.J.

[21] Appl. No.: 43,728

[22] Filed: May 30, 1979

[51] Int. Cl.³ .............................................. H01S 3/16
[52] U.S. Cl. ............................................... 331/94.5 F
[58] Field of Search ................................... 331/94.5 F

[56] References Cited

U.S. PATENT DOCUMENTS 3,970,960  7/1976  Mollenauer .................... 331/94.5

OTHER PUBLICATIONS

"Reorientation of M Centers In KCl" Schneider; *Phys. Rev. Lett.* vol. 24, No. 23 pp. 1296–1298, Jun. 1970.
"The $F_2^+$ Center in KCl Crystals Part II: Optical Properties and Analogy with the $H_2^+$ Molecule" Aegerter et al.; *Phys. Stat. Sol.* (1971) (b), vol. 23, pp. 245–261.
"Broadly Tunable Lasers Using Color Centers"; Mollenauer et al.; *Jrnl. App. Physics* vol. 46, No. 7, (Jul. 1975) pp. 3109–3118.
"Broadly Tunable CW Lasers Using $F_2^+$ Centers for 1.26–1.48 and 0.82–1.07 μm Bands"; Mollenauer et al.; *Optics Lett.* Vol. 3, No. 2, Aug. 1978, pp. 48–50.

*Primary Examiner*—William L. Sikes
*Assistant Examiner*—Leon Scott, Jr.
*Attorney, Agent, or Firm*—Michael B. Einschlag

[57] ABSTRACT

Intense optical pumping of the $1S\sigma_g \to 2P\sigma_u$ transition of the $F_2^+$ color center as required for laser action produces a slow orientational bleaching of the $F_2^+$ color centers that is eventually debilitating to the $F_2^+$ color center laser action. This bleaching is prevented by periodically or continuously subjecting the color centers to a two-step pumping with polarized radiation such that the centers are all returned to the optimal orientation for absorbing pumping radiation for laser action.

19 Claims, 8 Drawing Figures

MAINTENANCE OF OPTIMAL ORIENTATION IN $F_2^+$ COLOR CENTER LASERS

BACKGROUND OF THE INVENTION

The invention pertains to the field of $F_2^+$ color center lasers.

Intense optical pumping of the $1S\sigma_g \rightarrow 2P\sigma_u$ transition of an $F_2^+$ color center, as required for laser action, produces a slow orientational bleaching of the $F_2^+$ color centers that is eventually debilitating to the laser action. An article entitled "The $E_2^+$ Center in KCl Crystals Part II: Optical Properties and Analogy with the $H_2^+$ Molecule", by M. A. Aegerter and F. Luty, Phy. Stat. Sol. (b), Vol. 43, pp. 245-261, 1971 has shown that direct, single step pumping of the $1S\sigma_g \rightarrow 2P\pi_u$ transition, for crystal temperatures higher than a few tenths of degrees K., gives rise to a non-radiative decay to the $2P\sigma_u$ state which produces a reorientation of the color centers. By choosing an appropriate light polarization, such pumping can be used to return all the color centers to the desired orientation. However, the ultraviolet source required for such pumping tends to release electrons from other defects in the crystal, thereby discharging the $F_2^+$ color centers. As a result single step reorientational pumping is not a truly satisfactory method for repetitive reorientation in a color center laser.

SUMMARY OF THE INVENTION

In accordance with the present invention, a method for maintaining a preferred orientation of $F_2^+$ color centers for laser action in an $F_2^+$ color center laser is provided by periodically subjecting the color centers to a two-step pumping with radiation having a component of polarization orthogonal to the preferred orientation where the photon energies contained in the reorientation pumps are low enough to completely avoid releasing electrons from other defects in the crystal. In one embodiment the first step comprises pumping the $1S\sigma_g \rightarrow 2P\sigma_u$ transition in the $F_2^+$ color center with first radiation from a first source whose polarization is orthogonal to that normally used for producing laser action. The second step comprises pumping the $F_2^+$ color center with second radiation from a second source having the same polarization as the first radiation and having energy which causes a transition from the $2P\sigma_u$ state to an even-parity excited state, for example the $2S\sigma_g$ and $3D\sigma_g$ are the lowest lying even-parity excited states in the $F_2^+$ color center. This reorientational two-step pumping may be used on a periodic basis during normal laser excitation, i.e., when pumping between the $1S\sigma_g \rightarrow 2P\sigma_u$ state with radiation polarized along the preferred orientation.

The light source for the second step transition need not be a laser. For example, a small intense arc lamp source, combined with an appropriate linear polarizer and band-pass filter to provide the desired photon energy band would suffice.

BRIEF DESCRIPTION OF THE DRAWING

A complete understanding of the present invention and of the above and other features thereof may be gained from a consideration of the following detailed description presented hereinbelow in connection with the accompanying drawing in which.

DETAILED DESCRIPTION

Figure 1:
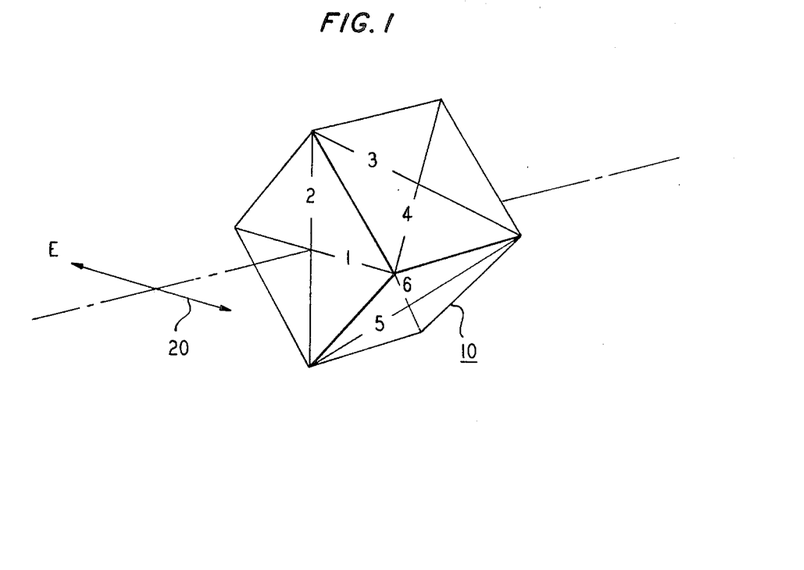
FIG. 1 shows a diagram of the six possible $F_2^+$ color center [110] axis orientations in an alkali halide crystal and the orientation they have with respect to the direction of polarization of the pump radiation.

An $F_2^+$ color center consists of a pair of anion vacancies adjacent to each other and sharing a single electron in an alkali halide crystal. The axis of the pair of vacancies is the line joining the centers of the two vacancies. The axis can be any one of the six [110] axes of the alkali halide lattice which constitute the six face diagonals of a cube. This is illustrated in FIG. 1 where cube 10 shows axes 1-6.

Figure 2:
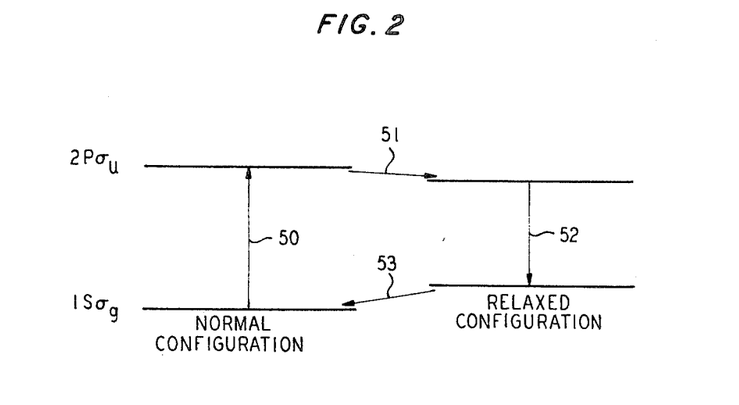
FIG. 2 shows a diagram of the levels of an $F_2^+$ color center pertinent to laser action.

The optical pumping cycle of an $F_2^+$ color center laser is shown in FIG. 2. It consists of a four-step mechanism: excitation is shown by arrow 50, relaxation is shown by arrow 51, luminescence is shown by arrow 52, and relaxation back to ground state in the normal configuration is shown by arrow 53. For the $F_2^+$ color center, relaxation consists merely in a slight increase in the separation of the two vacancies. The model of an $H_2^+$ molecular ion embedded in a dielectric continuum seems to fit the $F_2^+$ color center particularly well. The levels in the spectrum of the $F_2^+$ color center are normally designated after their $H_2^+$ molecular ion counterparts.

Figure 3:
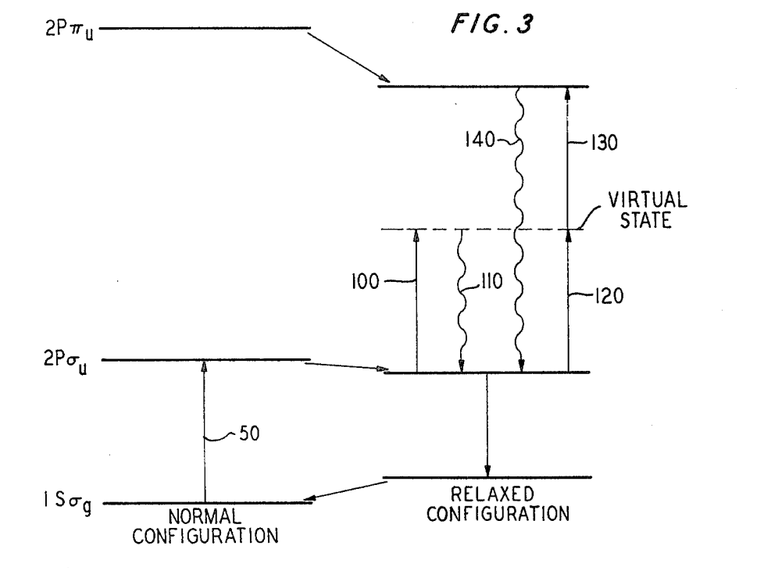
FIG. 3 shows a diagram of the pertinent levels in an $F_2^+$ color center laser which illustrates several orientational bleaching mechanisms.

We have discovered that intense optical pumping of the $1S\sigma_g \rightarrow 2P\sigma_u$ transition of the $F_2^+$ color center, shown by arrow 50 in FIG. 2 produces a slow orientational bleaching of the $F_2^+$ color centers that debilitates laser action. The usual relation between the electric field of the laser pump beam to the $F_2^+$ color center axes is shown in FIG. 1. Since the dipole moment of the $1S\sigma_g \rightarrow 2P\sigma_u$ transition is parallel to the color center axis, axis 1 is optimally oriented with respect to the polarization of the pump beam shown by arrow 20. Axes 3, 4, 5 and 6 are less favorable for laser action with respect to the pump beam and note that color centers aligned along axis 2 can make no contribution at all to laser action. The orientational bleaching effect consists of a gradual shift of color center population away from orientation along axis 1 to the less desirable orientations. Ultimately, we have found that almost all the color centers are lined up along axis 2. We have measured the dependence of the reorientation rate w, on pump intensity and have found the following empirical relation $$w = (AI^2 + BI^3)/(1 + I/I_{sat}) \qquad (1)$$

where $I_{sat}$ is the saturation intensity for the $1S\sigma_g \rightarrow 2P\sigma_u$ transition, I is the pump intensity, and A and B are constants. The term in $I^2$ corresponds to a two photon process. This is illustrated in FIG. 3 where one of the photons from the laser pump excites the transition $1S\sigma_g \rightarrow 2P\sigma_u$, shown as arrow 50 in FIG. 3, and a second photon from the laser pump involves a transition from the $2P\sigma_u$ to a virtual state, shown by arrow 100 in FIG. 3. Arrow 110 shows the deexcitation from the virtual state to the $2P\sigma_u$ level in the relaxed configuration of the $F_2^+$ color center. The term in $I^3$ represents a similar process except that the second step involves a two photon transition out of $2P\sigma_u$, most likely to the $2P\pi_u$ state. This is shown in FIG. 3 where one of the photons from the laser pump excites the color center from the $1S\sigma_g \rightarrow 2P\sigma_u$, shown by arrow 50, a second photon from the laser pump excites the center to a virtual state, shown by arrow 120, and a third photon excites the color center from the virtual state to the $2P\pi_u$ state, shown by arrow 130. The color center then has a radiationless deexcitation from the $2P\pi_u$ state to the $2P\sigma_u$ state, shown by arrow 140. In either the two-photon or three-photon mechanisms, a nonradiative deexcitation to either the ground state or to the $2P\sigma_u$ state provides the energy for reorienting the color center and causes the bleaching effect.

The Aegerter and Lüty reference mentioned above has shown that direct, single step pumping of the $1S\sigma_g \rightarrow 2P\pi_u$ transition, for crystal temperatures higher than a few tenths of degrees K, leads to a similar nonradiative decay to the $2P\sigma_u$ state which also causes reorientational bleaching of the color centers. They suggest that pumping the $F_2^+$ color center with light having the appropriate polarization can be used to return all the color centers to the desired orientation, shown by axis 1 in FIG. 1. However, the ultraviolet source required for such pumping tends to release electrons from other defects in the host crystal for the $F_2^+$ color centers. These electrons then have the deleterious effect of discharging the $F_2^+$ color centers. This effect makes such single step pumping unsatisfactory for repetitive orientation of the $F_2^+$ color centers in a laser.

The method provided in accordance with the present invention for reorienting $F_2^+$ color centers comprises periodically or continuously subjecting the color centers to a two-step pumping with polarized light such that the color centers are all returned to the orientation denoted by axis 1 in FIG. 1. The photon energies used are low enough to completely avoid the release of electrons from other defects in the crystal. This is accomplished in one embodiment by pumping the centers at substantially the same time with radiation from two vertically polarized beams (where vertical polarization means polarization which is parallel to axis 2 of FIG. 1). Periodic two-step pumping is applied during the "laser-off" part of a laser pumping duty cycle. The "laser-on" part of the pumping duty cycle occurs when one pump beam is used and that pump beam is polarized horizontally (where horizontal polarization means polarization parallel to axis 1 in FIG. 1). A photon from the first beam causes an excitation of the center from the $1S\sigma_g \rightarrow 2P\sigma_u$ state and a photon from the second beam excites the color center from the $2P\sigma_u$ state to an even-parity excited state.

Figure 4:
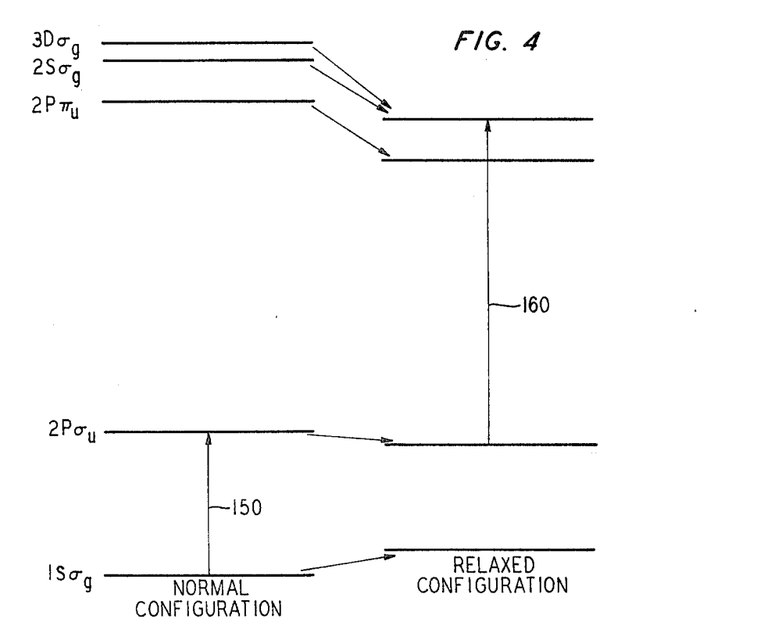
FIG. 4 shows a diagram of the energy levels of the $F_2^+$ color center pertinent to the two-step excitation used for maintaining a preferred orientation of the color centers.
Figure 5:
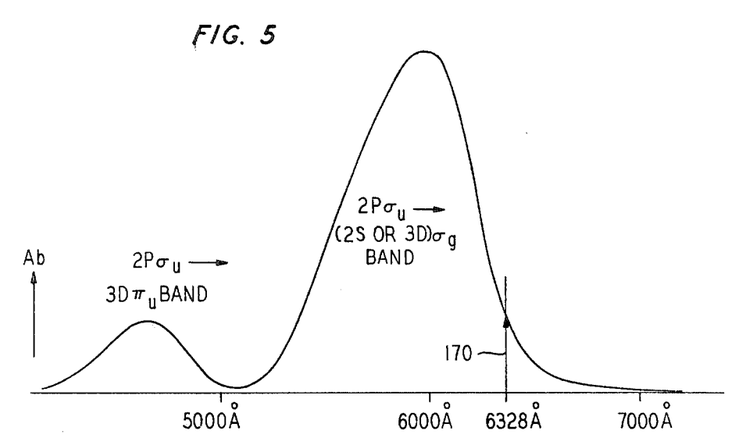
FIG. 5 shows an excited state absorption spectrum of a KF crystal containing $F_2^+$ color centers.

According to the $H_2^+$ molecular ion model disclosed in the above-mentioned Aegerter and Lüty reference, the lowest lying even-parity excited states are $2S\sigma_g$ and $3D\sigma_g$. These states are both located very close to the $2P\pi_u$ state, see FIG. 4. In FIG. 4 arrow 150 shows the excitation of the color center from $1S\sigma_g \rightarrow 2P\sigma_u$ and arrow 160 shows excitation from the $2P\sigma_u$ to the even-parity excited state. FIG. 5 shows the result of an excited-state absorption experiment performed on a host KF crystal and provides direct evidence for the existence of these even-parity excited states at just about the energies predicted by the $H_2^+$ molecular ion model. We note that in KF, the $2P\sigma_u \rightarrow (2S$ or $3D)\sigma_g$ transition band overlaps the helium-neon laser wavelength of 6328 Å, as shown by arrow 170 in FIG. 5.

Although we have shown an excitation which excites the $F_2^+$ color center from the $1S\sigma_g \rightarrow 2P\sigma_u$ and then to an even-parity excited state, it should be noted that this is not exclusive. The effect may be achieved, albeit not as efficiently, by using beams of photons that have energies which are too low to free electrons from other defects in the host crystals. The reorientation might be effected by utilizing a two-photon transition from the $1S\sigma_g$ state such that the contribution to the transition probability derives almost exclusively from the $2P\sigma_u$ state. The two-photon transition might be pumped by photons obtained from radiation from two sources or even from one source. Of course, it should be clear that the polarization of the radiation should be maintained perpendicular to that of the preferred direction.

Figure 6:
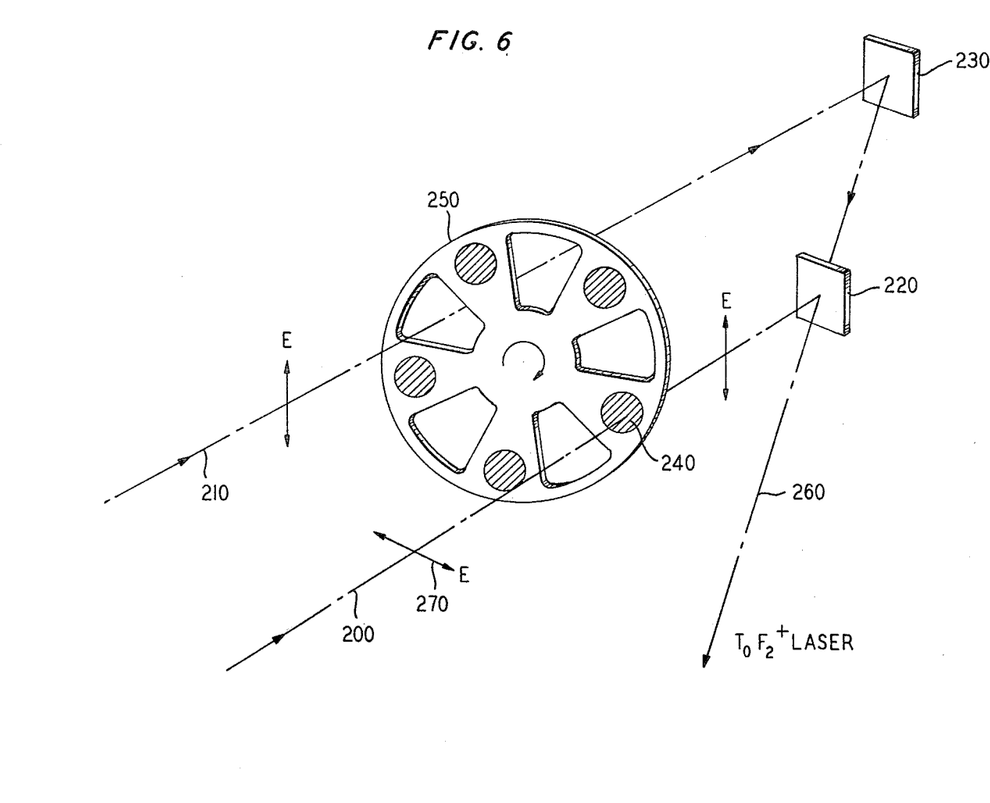
FIG. 6 shows an embodiment of an apparatus for maintaining the preferred orientation of the $F_2^+$ color centers according to the two-step method of pumping.

One of many possible embodiments for achieving the periodic reorientation of the color centers is shown in FIG. 6. The particular figure is pertinent to $F_2^+$ color centers in a host KF crystal. There the pumping of the main laser transition ($1S\sigma_g \rightarrow 2P\sigma_u$) is provided by a 1.064 μm beam (200) from a Nd:YAG laser and the pumping for the second-step transition is provided by a 6328 Å beam (210) from a He-Ne laser. It should be clear to those skilled in the art that an appropriate change in both wavelengths will enable the embodiment shown in FIG. 6 to apply to an $F_2^+$ color center in any host. Mirror 230 is a good reflector for the 6328 Å beam and mirror 220 is dichroic, being a good reflector for the pump beam from the Nd:YAG laser and a good transmitter for the second-step beam from the He-Ne laser. Chopping wheel 250 is rotated so that it alternately blocks beam 210 from the He-Ne laser while transmitting beam 200 from the Nd:YAG laser (with unaltered horizontal polarization parallel to axis 1 in FIG. 1), and transmits beam 210 from the He-Ne laser while rotating the polarization of beam 200 from the Nd:YAG laser by 90 degrees. The polarization of beam 200 is rotated by use of a half-wave plate 240. This was achieved in one embodiment by gluing inexpensive plastic half-wave plates across holes drilled in the rim of chopping wheel 250. The embodiment shown in FIG. 6 was used with a 5 watt pumping beam at 1.064 μm and a 2 mw beam at 6328 Å with a 50 percent duty cycle. Despite the relatively low power of the He-Ne beam, the overall reorientation rate due to the combined vertically polarized beams, shown as 260 in FIG. 6, was much higher than the orientational bleaching rate caused by the laser pump beam irradiating the crystal alone. Furthermore, the chopping frequency used, a few hundred Hz, was found to be very high compared to the absolute orientational bleaching rate. Thus, we found that the vast majority of the $F_2^+$ color centers were put into the orientation corresponding to axis 1 in FIG. 1 and were held there continuously.

Figure 7:
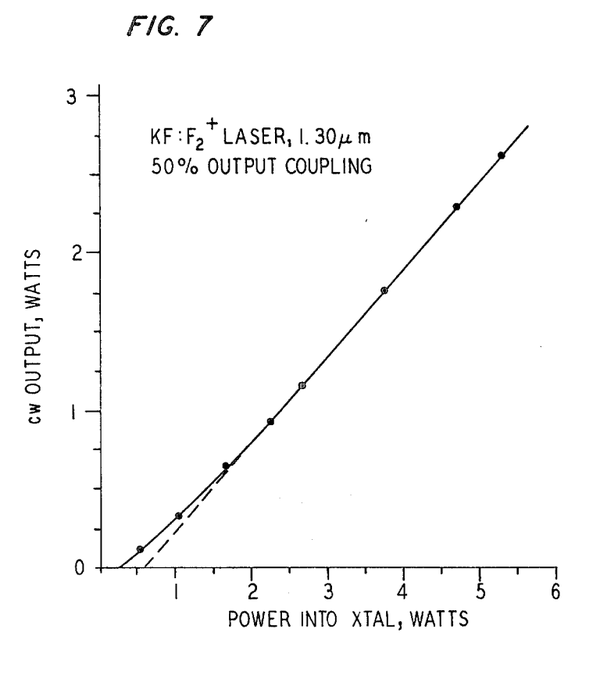
FIG. 7 shows the measured efficiency of an $F_2^+$ color center laser in a KF crystal for cw operation.

FIG. 7 shows the efficiency of the KF laser in cw operation. The very high efficiency of 55 percent indicated there is due at least, in part, to the fact that practically all the dipoles of the laser transition had the preferred orientation.

It should be clear to those skilled in the art that the relative length of the "laser-on" period, i.e., pumping the laser transition, vs. the "center-reorientation" period, i.e., pumping the two-step mechanism, may be different from the ∼ 50 percent duty cycle described hereinabove. Depending on the power available for the second-step excitation and the degree to which the available source wavelength matches the peak of the $2P\sigma_u \rightarrow (2S \text{ or } 3D)\sigma_g$ band, the "center-reorientation" period may be reduced to a relatively small fraction of the total laser excitation duty cycle.

The light source for the second-step excitation need not be a laser. In some cases, intense arc lamp source combined with an appropriate bandpass filter would also be appropriate. It should also be clear to those skilled in the art that the beam used for the second-step excitation need not propagate exactly along the same path as the pump beam. It could impinge upon the host crystal at an angle tens of degrees removed from the path of the laser pump beam, the only requirement being that its electric field have a nonzero (preferably large) projection along the axis shown as axis 2 in FIG. 1. It should also be clear to those skilled in the art that the chopping wheel shown in FIG. 6 representes only one of many possible embodiments for achieving chopping and polarization switching. It should also be noted that the chopping frequency can be varied over very extensive limits, from less than 1 Hz to 1 MHz or even higher.

Another embodiment of the present invention involves utilizing an elliptically polarized laser pump beam which is operated continuously. This may be achieved by eliminating chopping wheel 250 in FIG. 6 and placing a quarter-wave plate permanently in laser pump beam 200, such that the bump beam becomes elliptically polarized with its major axis in the horizontal plane. This creates two components from the laser pump intensity $I_0$; $I_1$ in the horizontal plane, and $I_2$ in the vertical plane, where $I_1 + I_2 = I_0$. $I_2$ then corresponds to the intensity of the first source mentioned above in the specification. This radiation is combined with the radiation in beam 210 to provide the two-step pumping and reorientation. It should be clear to those skilled in the art as to how variations in this basic embodiment may be achieved. This may have some advantages over a periodic application of the two-step pumping due to the following: (a) allows for a true cw operation of the $F_2^+$ color center laser, (b) achieves a greater time-average power output from the $F_2^+$ color center laser from the same pump source (c) provides a quieter, more stable operation of the laser which may be important in uses requiring ultrahigh frequency definition and/or high amplitude stability.

Another embodiment may be achieved by eliminating chopping wheel 250 in FIG. 6 and placing a half-wave plate permanently in laser pump bean 200 to rotate the plane of polarization, shown as arrow 270, through an angle $\theta$ from the horizontal, where $\theta$ is not equal to 90 degrees. This creates two components from the laser pump intensity $I_0$; $I_1 = I_0 \cos^2 \theta$ in the horizontal plane and $I_2 = I_0 \sin^2 \theta$ in the vertical plane. $I_2$ then corresponds to the intensity of the first source mentioned above in the specification. This radiation is combined with the radiation in beam 210 to provide the two-step pumping and reorientation. It should be clear to those skilled in the art as to how variations in this basic embodiment may be achieved.

This application incorporates by reference, the article "Broadly Tunable cw Lasers Using $F_2^+$ Centers for the 1.26-1.48 and 0.82-1.07 μm Bands," Optics Letters, Vol. 3, No. 2, Aug. 1978, by L. F Mollenauer, D. M. Bloom and A. M. DelGandio, pp. 48-50.

Figure 8:
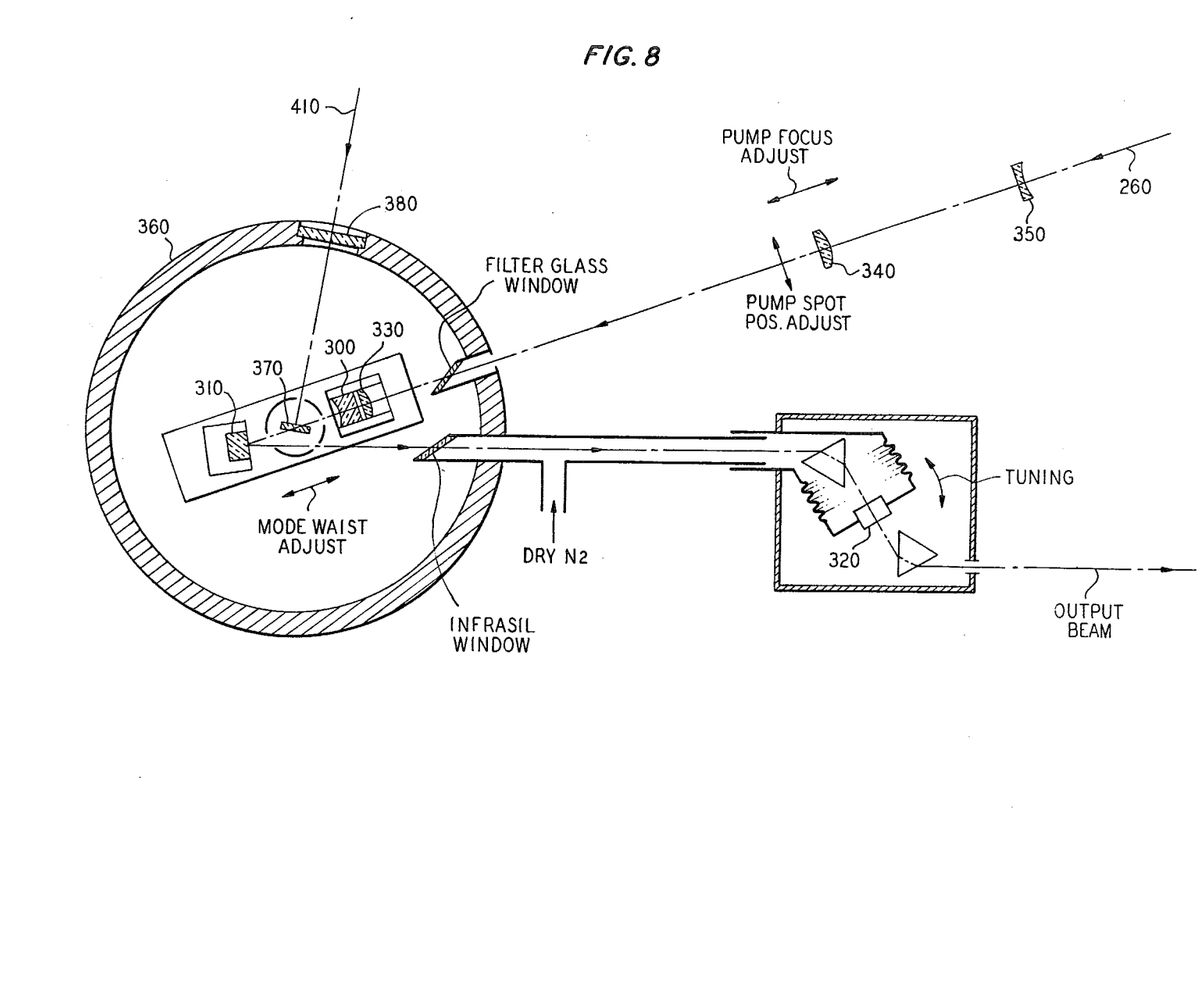
FIG. 8 shows an $F_2^+$ color center laser apparatus.

A laser utilizing $F_2^+$ color centers is shown in FIG. 8. Mirrors 300(r=25 mm), 310(r=50 mm), and 320(r= ) constitute the usual folded astigmatically compensated cavity. Mirror 300 is dichroic (T≈86 percent at 1.064 μ to allow coaxial pumping). The pump beam 260, generated by the embodiment shown in FIG. 6, is focused by leans 330 and is brought into final adjustment through the motion of lens 340. The pump beam waist size is varied over a wide range by common motion of lenses 350 and 340 (as the pair of lenses 340 and 350 is brought closer to the laser the waist becomes smaller. All six lens surfaces and the back of mirror 300 were antireflection coated for radiation at 1.064 μm. Mirrors 300, 310 and lens 330 were mounted in a subassembly that could be accurately translated along the beam axis by way of a mechanical feed-through in the vacuum pot wall 360. This made it possible to adjust the position of the mode beam waist with respect to the fixed crystal 370 while the laser was operating and without disturbing the cavity alignment. A similar adjustment was utilized for mirror 310 to allow for a cavity stability range adjustment without disturbing the cavity alignment.

The $F_2^+$ color centers were created in $Pd^{++}$ doped KF crystals through electron bombardment followed by a two-step photoionization as described in the above-identified reference. Window 380 in laser vacuum pot 360 allows for the in situ two-step photoionization by beam 410. The resultant $F_2^+$ color center density created was sufficiently high to allow for at least 90 percent absoprtion of laser pump beam 260 when efficient laser action prevented saturation.

Pump 260 was polarized parallel to axis 1 in FIG. 1 to pump the laser transition during the "laser-on" period and was polarized parallel to axis 2 in FIG. 1 and joined by a few milliwatts of similarly polarized radiation at 6328 A to reorient the $F_2^+$ color centers during the "center-reorientation" period. Crystal slab 370 was cut such that a [110] axis, i.e., the axis 1 of FIG. 1, was exactly parallel to the electric fields of the pump and laser beams inside the crystal. The optimum cw performance obtained is shown in FIG. 7.

We claim:
1. An $F_2^+$ color center laser which comprises:
an optical resonant laser laser cavity delimited by energy abstracting means;
an alkali halide crystal having $F_2^+$ color centers aligned along a preferred direction, said crystal being disposed within said cavity;
a first source for providing radiation which produces a population inversion in said $F_2^+$ color centers, said radition having a polarization along said preferred direction; and
means for applying said radiation to said $F_2^+$ color centers;
characterized in that
said laser further includes at least one other source of radiation having a polarization component which is substantially perpendicular to said preferred direction and having photon energies lower than that required for a single photon to discharge electrons from defects other than the $F_2^+$ color centers in said alkali halide crystal;

means for applying said radiation further includes means for applying the radiation from said at least one other source to said alkali halide crystal;

2. An $F_2^+$ color center laser as defined in claim 1 wherein said means for applying said radiation further includes means for generating a polarization component in the radiation from said first source which is substantially perpendicular to said preferred direction.

3. An $F_2^+$ color center laser as defined in claim 2 wherein said laser further includes means for interrupting the application of said polarization component in the radiation from the first source to said alkali halide crystal.

4. An $F_2^+$ color center as defined in claim 3 wherein said means for generating a polarization component in the radiation from said first source comprises a half-wave plate and said means for interrupting the application of said polarization component comprises a rotatable chopping wheel, disposed in the path of said radiation, having apertures and said half-wave plates disposed thereon and means for rotating said chopping wheel so that said radiation passes through said half-wave plate at one orientation of said chopping wheel to produce said polarization component and through said apertures to interrupt the application of said polarization component at another orientation of said chopping wheel.

5. An $F_2^+$ color center laser as defined in claim 2 wherein said at least one other source is a laser.

6. An $F_2^+$ color center laser as defined in claim 5 wherein said alkali halide crystal is a KF crystal, said first source is a Hd:YAG laser and said at least one other source is a He-Ne laser.

7. An $F_2^+$ color center laser as defined in claim 2 wherein said at least one other source comprises an arc lamp and a bandpass filter for providing said photon energies of the radiation from at least one other source that are lower than that required for a single photon to discharge electrons from defects other than the $F_2^+$ color centers in said alkali halide crystal.

8. An $F_2^+$ center laser as defined in claim 2 wherein said means for generating a polarization component in the radiation from said first source comprises a quarter-wave plate.

9. A method for producing orientational alignment in $F_2^+$ color centers in a host crystal having a preferred direction of alignment which comprises the steps of:
irradiating said $F_2^+$ color centers with a first beam of radiation having a polarization component which is substantially perpendicular to said preferred direction and having an energy lower than that required for a single photon to discharge electrons from defects other than the $F_2^+$ color centers in said host crystal;
irradiating said $F_2^+$ color centers with a second beam of radiation at substantially the same time as said first step of irradiating, said radiation having a polarization substantially perpendicular to said preferred direction and having an energy lower than that required for a single photon to discharge energy from defects other than the $F_2^+$ color centers in said host crystal.

10. A method for producing orientational alignment in $F_2^+$ color centers as defined in claim 9 wherein said first beam of radiation has an energy substantially equal to the energy between the $1S\sigma_g$ and $2P\sigma_u$ states in the said $F_2^+$ color center.

11. A method for producing orientational alignment in $F_2^+$ color centers as defined in claim 10 wherein said second beam of radiation has an energy which is substantially equal to the energy between the $2P\sigma_u$ and the next lowest lying even-parity states in said $F_2^+$ color center.

12. A method for producing orientational alignment in $F_2^+$ color centers as defined in claim 11 wherein said lowest lying even-parity states are the $2S\sigma_g$ and $3D\sigma_g$ states of said $F_2^+$ color center.

13. A method for producing orientational alignment in $F_2^+$ color centers in a KF host crystal as defined in claim 9 wherein said first beam of radiation has photons having an energy equal to 1.064 $\mu$m and said second beam of radiation has photons having an energy equal to 6328 A.

14. An apparatus for providing reorientation of $F_2^+$ color centers having a preferred direction of alignment which comprises:
an alkali halide crystal having said $F_2^+$ color centers;
a first source of radiation having a polarization component which is substantially perpendicular to said preferred direction and having photon energies lower than that required for a single photon to discharge electrons from defects other than the $F_2^+$ color centers in said alkali halide crystal;
a second source of radiation having a polarization which is substantially perpendicular to said preferred direction and having photon energies lower than that required for a single photon to discharge electrons from defects other than the $F_2^+$ color centers in said alkali halide crystal; and
means for applying radiation from said first source and said second source to said alkali halide crystal at substantially the same time.

15. An apparatus for providing reorientation of $F_2^+$ color centers in a host crystal having a preferred direction of alignment as defined in claim 14 which further includes a means for interrupting said application of radiation from said first and said second source.

16. An apparatus for providing reorientation of $F_2^+$ color centers in a host crystal having a preferred direction of alignment as defined in claim 14 wherein said first source is a laser.

17. An apparatus for providing reorientation of $F_2^+$ color centers in a host crystal having a preferred direction of alignment as defined in claim 16 wherein said second source of radiation is a laser.

18. An apparatus for producing orientational alignment in $F_2^+$ color centers in a KF host crystal as defined in claim 17 wherein said first source of radiation is a Nd:YAG laser and said second source of radiation is a He-Ne laser.

19. A method for producing orientational alignment in $F_2^+$ color centers in a host crystal having a preferred direction of alignment which comprises the step of:
irradiating said $F_2^+$ color centers with a beam of radiation having a polarization substantially perpendicular to said preferred direction and having an energy lower than that required for a single photon to discharge electrons from defects other than the $F_2^+$ color centers in said host crystal, whereby at least one photon from said beam causes an excitation which reorients each of said $F_2^+$ color centers.

* * * * *

UNITED STATES PATENT AND TRADEMARK OFFICE
CERTIFICATE OF CORRECTION

PATENT NO. : 4,255,719

DATED : March 10, 1981

INVENTOR(S) : David M. Bloom and Linn F. Mollenauer

It is certified that error appears in the above-identified patent and that said Letters Patent are hereby corrected as shown below:

Column 1, line 12, "The $E_2^+$ Center" should read --"The $F_2^+$ Center--. Column 5, line 24, "representes", should read --represents--. Column 5, line 61, "74" should read --$\theta$--. Column 6, line 9, "$\mu$" should read --$\mu m$--.

Signed and Sealed this

Twenty-third Day of June 1981

[SEAL]

Attest:

RENE D. TEGTMEYER

Attesting Officer

Acting Commissioner of Patents and Trademarks